United States Patent [19]

Nannen

[11] 4,201,503
[45] May 6, 1980

[54] THREAD RECONDITIONING TOOL

[76] Inventor: William G. Nannen, Box 242, Smethport, Pa. 16479

[21] Appl. No.: 901,619

[22] Filed: May 1, 1978

[51] Int. Cl.² .............................................. B23G 5/04
[52] U.S. Cl. .................................. 408/215; 10/123 P
[58] Field of Search .............. 408/215, 216, 218, 220, 408/221; 10/111, 123 R, 123 P, 123 S

[56] References Cited

U.S. PATENT DOCUMENTS

| 333,618 | 1/1886 | Ellrich . | |
|---|---|---|---|
| 1,857,493 | 5/1932 | Campaigne . | |
| 2,112,055 | 3/1938 | Tucker | 408/215 |
| 2,388,790 | 11/1945 | Mackliet | 10/1 |
| 2,567,849 | 9/1951 | Le Bron et al. | 10/1 |
| 2,822,555 | 2/1958 | Davis | 10/1 |
| 3,125,772 | 3/1964 | Beck | 408/218 |
| 3,956,787 | 5/1976 | Crumpacker | 10/1 B |
| 4,090,808 | 5/1978 | Nannen | 408/222 |

FOREIGN PATENT DOCUMENTS

| 39-14760 | 3/1964 | Japan . | |
|---|---|---|---|
| 211200 | 2/1924 | United Kingdom | 10/123 |

OTHER PUBLICATIONS

*SKC Tap & Die Catalogue,* p. 20.

*Primary Examiner*—Z. R. Bilinsky
*Attorney, Agent, or Firm*—Lane, Aitken & Ziems

[57] ABSTRACT

A tool for reconditioning or restoring the threads of externally threaded members, such as bolts, studs, and the like, includes, in one embodiment, a collet having a bore formed therethrough with a portion of the bore defining a guide surface, and a threading insert that includes thread cutting means. In order to recondition threads, the threading insert is selectively positioned along the longitudinal axis of the threaded member with the thread cutting means engaging the threads of the member. The collet is placed over the end of the member and positioned such that the threading insert is received within a socket formed in the collet thereby retaining the threading insert in place against the externally threaded member. Rotation of the tool relative to the threaded member causes the cutting means to recondition the threads. In one alternate embodiment, the cutting means are associated with the collet rather than with the threading insert.

16 Claims, 12 Drawing Figures

THREAD RECONDITIONING TOOL

FIELD OF THE INVENTION

The present invention relates to threading tools and, more particularly, to tools for reconditioning or restoring the threads of externally threaded members.

BACKGROUND OF THE INVENTION

Threaded members frequently become unusuable because of damage to the threads and/or the presence of foreign matter between the threads. Thread damage includes both physical damage to the thread profiles and damage to the surfaces of the threads. Thread profile damage can be caused when the threaded member is mis-threaded, cross-threaded, stripped, or otherwise abused; and surface damage can occur through long continued use of the threaded member which causes surface spalling of the threads. Foreign matter, such as corrosion, rust, paint, and the like, can be formed or introduced between the threads by leaving the threaded member unprotected from the environment or the source of foreign matter. In general, such threaded members can be reconditioned or restored by means of a thread reconditioning tool.

A wide variety of thread reconditioning tools are known, and they can generally be divided into threading dies, either one piece or multi-piece dies, and adjustable thread reconditioning tools. Single piece threading dies, which are primarily used to cut threads into unthreaded shafts, can also be used to recondition threads. Typically, the die is started at one end of the threaded member and rotated relative the threaded member until the cutting edges of the die restores the original thread profile, reforms the surface of the threads, and removes any foreign matter from between the threads. Multi-part threading dies, which generally have two diametrically opposite cutting die portions, are similar in operation to a single piece dies except that they can be assembled to the threaded member anywhere along the longitudinal axis of the member. Adjustable thread reconditioning tools generally include a guide surface, such as a curved or 'V' shaped anvil against which the threaded member is placed, and a radially adjustable thread cutting means which is manually adjusted to engage the thread.

Each one of the known thread reconditioning tools is adequate to perform its intended function, but each possesses one or more drawbacks inherent in its design. For example, the single piece threading die must be started over the end of the theaded member. This is particularly disadvantageous when only the middle portion of a relatively long threaded member is damaged or when the end-most threads are damaged making it difficult to properly start the die. While multi-part dies can be assembled onto the threaded member at the desired longitudinal location, they require an adjusting step to position the die portions relative to one another and to the threaded member. Likewise, the adjustable thread reconditioning tools also require an adjustment step to locate the thread cutting means relative to the threaded member. The adjustment step required by multi-part dies and adjustable thread reconditioning tools requires that the tool user have a minimum level of skill to properly adjust the cutting means with respect to the thread to be reconditioned. For example, if the cutting means is loosely adjusted, the thread may not be reconditioned on the first attempt, thereby requiring repeated efforts to successfully recondition the thread. Moreover, if the cutting means is too tight, the final reconditioned thread may be smaller in diameter than acceptable.

Therefore, it is a broad overall object of the present invention, among others, to provide a new and improved thread reconditioning or restoring tool which overcomes the disadvantages of known thread reconditioning tools.

Accordingly, it is an object of the present invention to provide a thread reconditioning tool for reconditioning or restoring damaged threads and/or removing foreign matter from between threads on a threaded member which is simple in construction, has a minimum number of parts, is simple to operate, and inexpensive to manufacture.

It is another object of the present invention to provide a thread reconditioning tool which can be quickly placed over and located at a selected position along the longitudinal axis of a threaded member.

It is still another object of the present invention to provide a thread reconditioning tool which can be quickly and conveniently engaged and disengaged with the threads of an externally threaded member by a tool user having a minimum level of skill.

It is a further object of the present invention to provide a thread reconditioning tool which can be quickly and conveniently operatively engaged with threads of a threaded member without making any adjustments of the cutting means relative to the thread.

SUMMARY OF THE INVENTION

In accordance with the aforementioned objects, the present invention provides a thread reconditioning tool for reconditioning or restoring damaged threads and/or removing foreign matter from between the threads of an externally threaded member which includes, in one embodiment, a collet having a throughbore and adapted to be placed over and selectively positioned along the longitudinal axis of the threaded member with a portion of the collet functioning as a guide surface, a threading insert having a thread cutting means on an inner surface thereof, and an insert retaining means associated with the collet to retain the cutting means of the insert against the threads of the threaded member, whereby rotation of the collet and the retained threading insert will cause the cutting means to recondition the threads. In another embodiment of the present invention, the cutting means are associated with the collet and the guide surface is associated with a retainer.

BRIEF DESCRIPTION OF THE DRAWINGS

The above brief description, as well as further objects, features, and advantages, of the present invention will be more fully appreciated by reference to the following detailed description of presently preferred but nonetheless illustrative embodiments in accordance with the present invention, when taken in conjunction with the accompanying drawings wherein.

DESCRIPTION OF THE PREFERRED EMBODIMENT

Figure 1:
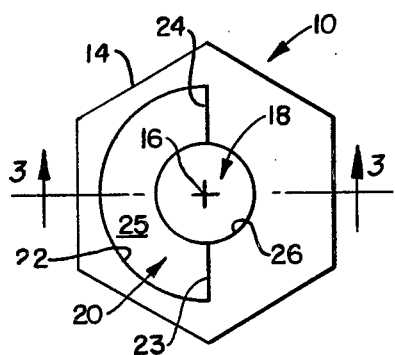
FIG. 1 is a plan view of a collet in accordance with a first embodiment of the present invention.
Figure 2:
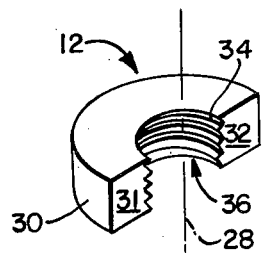
FIG. 2 is a perspective view of a semi-cylindrical threading insert having thread cutting means on an innerdiameter surface.
Figure 3:
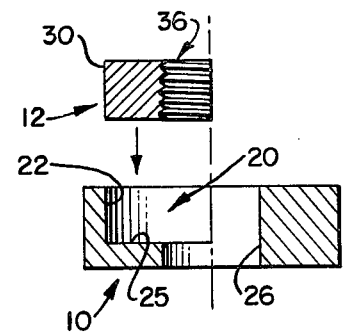
FIG. 3 is a side elevational view, in cross section, of the collet of FIG. 1, taken along line 3—3 of FIG. 1, and the insert of FIG. 2 positioned above an insert-receiving socket formed in the collet.

A preferred embodiment of a thread reconditioning tool in accordance with the present invention is shown in FIGS. 1 and 2 and includes a collet 10 and a threading insert 12 which are both adapted to be assembled together as shown in FIG. 3 to form the thread reconditioning tool.

The collet 12 is formed as a hexagonal element with a plurality of flat sides 14 disposed about a central axis 16. The collet 12 has an opening or bore 18 formed therethrough and a cavity or a socket 20 which is adapted to receive the threading insert 12, as described in detail below. The inside diameter of the bore 18 is preferably equal to the major diameter of the thread to be reconditioned and a selected clearance dimension. The socket 20, in its preferred form, has a semi-annular configuration which is defined by a peripheral locating surface 22, two flats 23 and 24, and a bottom surface 25. The smooth inside diameter of the bore 18 opposite from the socket 20 constitutes a guide surface 26 the function of which is described in detail below.

Figure 12:
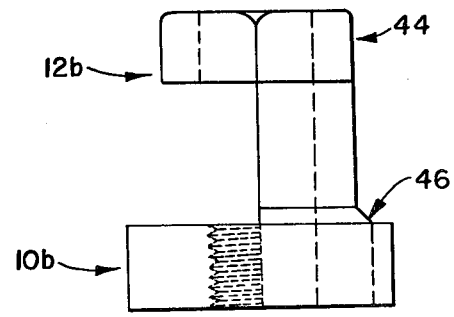
FIG. 12 is a side elevational view of the collet and the extended retainer of FIG. 11 shown in their assembled position.

The threading insert 12, which has a semi-cylindrical configuration as shown in FIG. 12, is formed about a central axis 28 and is defined between an outside diameter surface 30, two diametric flats 31 and 32, and an inside diameter surface 34. The outside diameter surface and flats, 30-32, of the threading insert 12 and the peripheral locating surface and flats, 22-24, of the collet 12 constitute surfaces which are adapted to cooperate with one another to retain the threading insert 12 in the socket 20 during thread reconditioning as described below.

Thread cutting means, generally designated by the reference character 36, are located on the inside diameter surface 34 of the threading insert 12 and include, in the preferred form, two sets of thread cutters that are separated from one another by a relief cutout or flute as is well known in the art.

The threading insert 12 and the collet 10 are adapted to be assembled together as shown in FIG. 3 with the outer diameter locating surface and the flats, 30-32, of the threading insert 12 abutting the corresponding locating diameter surface and flats, 22-24, of the collet 10 such that the threading insert 12 is retained within the collet 10 with the cutting means 36 maintained in a fixed, spaced relationship relative the guide surface 26. The respective dimensions of the threading insert 12 and the socket 20 are selected such that a sliding fit exists between the threading insert 12 and the socket 20 to permit convenient insertion and removal of the threading insert 12 from the socket 20. With the collet 10 and the insert 12 assembled as described, the guide surface 26 is adapted to contact the tips or distal ends of the threads on the shaft to be reconditioned and thereby retain the shaft in engagement with the cutting means 36 on the threading insert 12. The physical relationship of the cutting means 36 relative to the locating surfaces is chosen such that the cutting means will effect the desired reconditioning of the threads when the reconditioning tool is assembled to a threaded shaft as described below.

Figure 4:
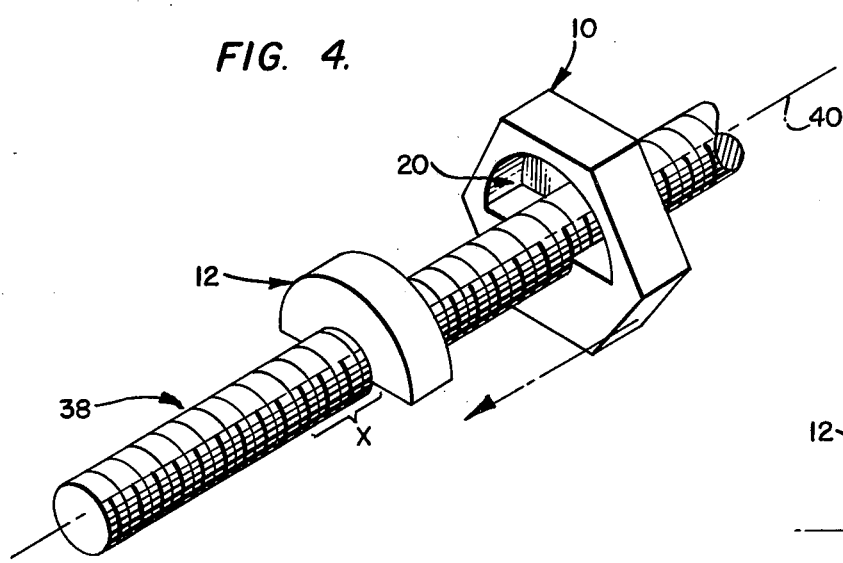
FIG. 4 is a perspective view of an externally threaded member having the threading insert of FIG. 2 mounted thereon at a selected axial location with the collet of FIG. 1.
Figure 5:
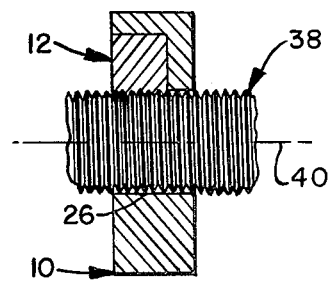
FIG. 5 is a side elevational view, in cross section, of the collet and insert of FIGS. 1 and 2 mounted on an externally threaded member.

A threaded shaft 38 may be reconditioned using the reconditioning tool as shown in FIGS. 4 and 5 by placing the threading insert 12 onto the shaft 38 adjacent the portion of the threads —X— to be reconditioned. The collet 10, with its socket 20 facing the threading insert 12, is placed over the end of the threaded shaft 38 and moved toward the insert 12 until the insert is received in its socket 20. As shown in FIG. 5, the insert 12 and the collet 10 are retained on the threaded shaft 38 with the guide surface 26 of the collet 10 contacting the tips of the threads and the abutting locating surfaces of the insert and socket maintaining the thread cutting means 36 in engagement with the threads. The reconditioning tool is then rotated relative to the shaft 38, either by hand or with a wrench applied to the flats 14, causing the reconditioning tool to advance along the shaft axis 40 with the cutting means 36 acting to recondition the threads and/or remove foreign matter from between the threads. After the threads have been reconditioned, the threading tool is disengaged from the shaft 38 by pulling the collet 10 away from the threading insert 12 and then off the end of the shaft, and removing the threading insert 12.

In the example shown in FIG. 4, the reconditioning tool is shown reconditioning the threads near the middle portion of the threaded shaft 38. The reconditioning tool is equally suited for reconditioning the threads at or near the end of the threaded shaft where it is generally difficult to properly start a one-piece threading die. The thread reconditioning tool is assembled to the threaded shaft adjacent the damaged end threads and unscrewed from the shaft, causing the thread cutting means 36 to recondition the end threads.

Figure 6:
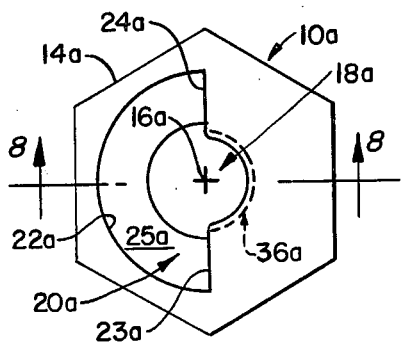
FIG. 6 is a plan view of a collet in accordance with a second embodiment of the present invention.
Figure 7:
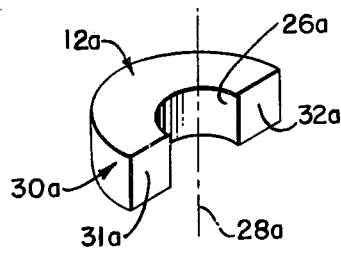
FIG. 7 is a perspective view of a semi-cylindrical retainer having an inner-diameter surface which functions as a guide surface.
Figure 8:
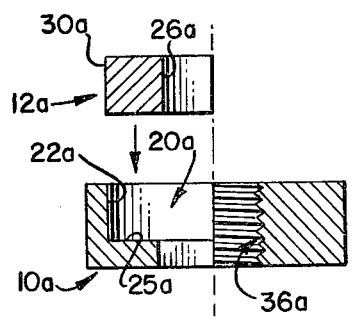
FIG. 8 is a side elevational view, in cross section, of the collet of FIG. 6, taken along line 8—8 of FIG. 6, and the retainer of FIG. 7 positioned above a retainer receiving socket formed in the collet.

An alternate embodiment of the present invention is shown in FIGS. 6 and 7 and includes a threading collet 10a and a retainer 12a which are adapted to be assembled together as shown in FIG. 8 to form a second embodiment of the thread reconditioning tool.

As in the case of the embodiments of FIGS. 1-5, the collet 10a of FIG. 6 has a plurality of flat sides 14a disposed about a central axis 16a to define a hexagonal element. The collet 10a has an opening or bore 18a formed therethrough and a socket 20a formed on one side of the bore. The socket 20a, which is adapted to receive a retainer 12a as described below, has a semi-cylindrical configuration which is defined by a peripheral diameter surface 22a, two diametric locating flats 23a and 24a, and a bottom surface 25a. Thread cutting means 36a are formed on the inside diameter portion of the throughbore 18a opposite from the socket 20a. The thread cutting means 36a include, in the preferred form, two sets of thread cutters separated by relief cutouts or flutes as is well known in the art.

The retainer 12a, which has a semi-cylindrical form as shown in FIG. 7, is disposed about a central axis 28a and is defined by an outer diameter surface 30a, two flats 31a and 32a, and an inside diameter surface 26a. The outside diameter surface and the diametric flats, 30a–32a, of the retainer 12a and the peripheral locating surface and flats, 22a–24a, of the collet 12a constitute locating surfaces which are adapted to cooperate with one another to retain the retainer 12a in the socket 20a during reconditioning as described below. The smooth inside diameter surface 26a functions as a guide surface which is adapted to contact the tips or distal portions of the threads on the threaded shaft and thereby maintain the thread cutting means 36a in engagement with the threads.

The retainer 12a and collet 10a are adapted to be assembled together as shown in FIG. 8 with the outside diameter surface and the diametric flats, 30a–32a, of the retainer 12a abutting the cooperating locating diameter and flats, 22a–24a, of the socket 20a. As in the case of the first embodiment, the respective dimensions of the various locating surfaces are chosen such that a sliding fit exists between the retainer 12a and the collet 10a for convenient insertion and removal of the retainer. When the collet 10a and the retainer 12a are assembled, the retainer is held in the socket 20a for rotation with the collet with the guide surface 26a maintained in a fixed, spaced relationship relative the cutting means 36a. With the collet 10a and the retainer 12a assembled as described, the smooth inside guide surface 26a of the retainer 12a is adapted to contact the tips of the threads to be reconditioned and thereby retain the shaft in engagement with the thread cutting means 36a on the inside surface of the collet 10a. The physical relationships of the cutting means 36a to the locating surfaces and the guide surface 26a are selected such that the cutting means 36a will effect the desired reconditioning when the tool is used to recondition a threaded shaft as described below.

Figure 9:
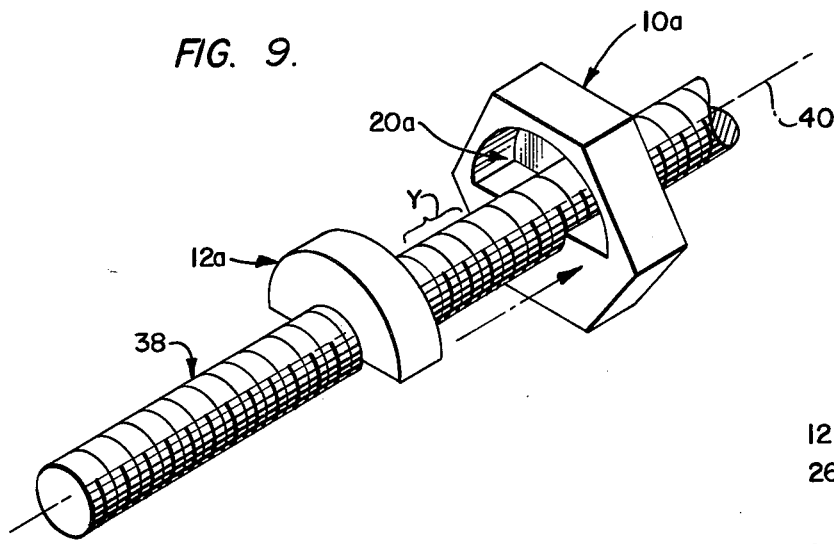
FIG. 9 is a perspective view of an externally threaded member having the collet of FIG. 6 and the retainer of FIG. 7 mounted thereon at a selected axial location with the collet of FIG. 6.
Figure 10:
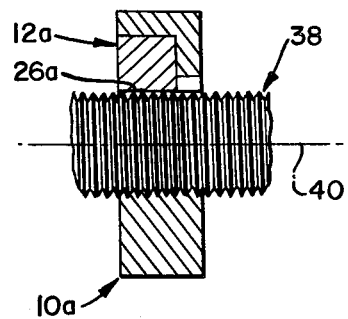
FIG. 10 is a side elevational view, in cross section, of the collet and retainer of FIGS. 6 and 7 mounted on an externally threaded member.

The reconditioning tool of FIGS. 6–8 may be used to recondition the threads of a threaded shaft 38 as shown in FIGS. 9 and 10 by placing the collet 10a over the ends of the threaded shaft 38 and moving the collet 10a to a position along the shaft 38 adjacent to the threads-Y-to be reconditioned. The retainer 12a is then inserted to its socket 20a. As shown in FIG. 10, the retainer 12a and the collet 10a are retained on the threaded shaft with the guide surface 26a of the retainer 12a contacting the tips of the threads and the cutting means 36a on the inside diameter surface of the collet 10a engaging the threads. The assembled tool is then rotated relative to the shaft 38, either by hand or with a wrench applied against the flats 14a, causing the tool to advance along the shaft axis 40 and the cutting means 36a to recondition the threads.

Figure 11:
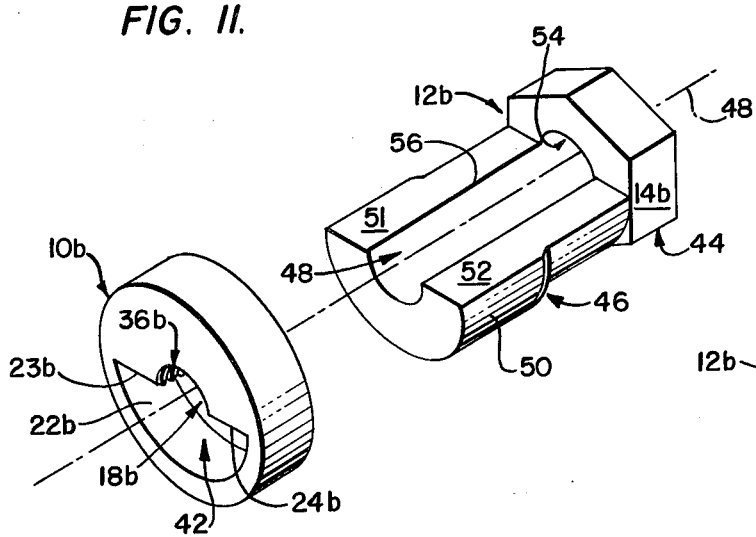
FIG. 11 is an exploded perspective view of a third embodiment of the present invention showing a collet that has thread cutting means and an axially extended retainer.

Another alternate embodiment of the present invention is shown in FIGS. 11 and 12 and includes a threading collet 10b and an axially extended retainer 12b which are adapted to be assembled together as shown in FIG. 12 to form a third embodiment of the thread reconditioning tool.

As shown in FIG. 11, the threaded collet 10b has a generally circular configuration with a bore 18b and a guide channel 42 formed therethrough. The diameter of the bore 18b, as in the case of the above described embodiments, is preferably equal to the major diameter of the threaded member to be reconditioned and a selected clearance dimension. The guide channel 42, has a generally semi-circular form, is defined between an outer locating surface 22b and two diametric flats 23b and 24b. Thread cutting means 36b, which may be identical to the previously described cutting means 36 and 36a, are located on the side of the bore 18b opposite the guide channel 42.

The extended retainer 12b, which may be formed as a unitary structure, includes a head 44 and a body 46 both of which are formed along a longitudinal axis 48. The head 44 is hexagonally-shaped with the flats 14b adapted to cooperate with a suitable wrench. The body 46 extends axially of the head 44, as a semi-cylindrical form defined by an outer locating surface 50 and diametric flats 51 and 52. A coaxial throughchannel 48 is formed along the longitudinal axis 48 of the extended retainer 12b and appears as a bore 54 formed through the head 44 and as a semi-cylindrical groove 56 formed in the body 46. The diameter of the coaxial channel 48 is preferably selected such that it is equal to the major diameter of the threaded member to be reconditioned and a preselected clearance dimension. The threading collet 10b and the extended retainer 12b are assembled as shown in FIG. 12 where the body 46 portion of the extended retainer 12b is inserted into the guide channel 42. The respective dimensions of the body 44 and the guide channel 42 are selected such that a sliding fit exists between them.

The assembled tool may be used to recondition threads in a manner similar to that described for the embodiment for FIGS. 6–10. The threading collet 10a is positioned at the desired location along the threaded manner, the extended retainer 12b placed over the shaft and assembled to the threading collet 10b, and the assembled tool rotated to effect the reconditioning as described above.

In the embodiments described above, the assembled reconditioning tool is rotated by hand or by means of a wrench applied to the flats 14, 14a, and 14b. However, the tool may also be rotated by other means, as for example, by securing a radially extending handle or diametrically extending handles to the collet to facilitate rotation, and, in addition, handle means may also be secured to the threading inserts or retainers to facilitate insertion and removal. While the tool elements of the various embodiments have been described as separate elements, it is also possible to connect the elements with a flexible or resilient band or connection to prevent unwanted separation of the tool elements. Also, the various locating surfaces of one or both of the tool elements in the above described embodiments may be slightly tapered with respect to their longitudinal axis such that the assembled tool can accommodate tolerance variations in the threaded member.

As can be seen from the above, the present invention provides a thread reconditioning tool of very simple construction, which is easy to use and inexpensive to manufacture. The tool can be quickly located at a selected position on a relative long threaded shaft thereby overcoming the disadvantages associated with one-piece threading dies, and can quickly engage and disengage the threaded shaft without need for any type of adjustment thereby overcoming the disadvantages associated with adjustable multi-part dies and adjustable thread reconditioning tools.

As is apparent to those skilled in the art, various changes and modifications may be made to the thread reconditioning tool of the present invention without departing from the spirit and scope of the present invention as recited in the amended claims and their legal equivalent.

What is claimed is:

1. A tool for reconditioning or rethreading the threads of an externally threaded member comprising:
   a collet having an opening formed therethrough and adapted to be placed over and selectively positioned along the longitudinal axis of an externally threaded member, a smooth portion of the inner surface of said opening adapted to contact the tips of the threads of the threaded member to thereby function as a guide surface;
   a threading element having thread cutting means on an inner surface thereof adapted to engage the threads of the externally threaded member and having a locating surface on another portion thereof; and
   at least one locating surface associated with said collet adapted to abut said locating surface of said threading element to maintain said cutting means in a fixed, spaced relationship relative to said guide surface;
   whereby said threading element is selectively positioned along an externally threaded element with said thread cutting means engaging the threads of the threaded member and said collet is positioned with said respective locating surfaces on said collet and threading element abutting one another and said guide surface contacting the tips of the threads of the external member.

2. The tool claimed in claim 1, wherein:
   said cutting means are maintained in said fixed, spaced relationship with said guide surface with said cutting means located on one side of said opening and said guide surface located on the opposite said therefrom.

3. The tool claimed in claim 1, wherein:
   said collet includes at least one pair of surfaces adapted to cooperate with a wrench to rotate said collet relative to the threaded member.

4. The tool claimed in claim 1, wherein:
   said locating surface of said collet and said locating surface of said threading element are arcuate.

5. The tool claimed in claim 1, wherein:
   said collet has a socket formed therein, said socket adapted to receive said threading element therein with a surface portion of said socket defining said collet associated locating surface which is adapted to abut said threading element locating surface to maintain said cutting means in said fixed, spaced relationship with said guide surface.

6. The tool claimed in claim 5, wherein:
   said threading element has a semi-cylindrical shape and include two locating flats adapted to cooperate with locating flats forming a part of said socket.

7. A tool for reconditioning and restoring the threads of an externally threaded member comprising:
   a collet having an opening formed therethrough adapted to be placed over and selectively positioned along the longitudinal axis of an externally threaded member;
   thread cutting means located on a portion of the inner surface of said opening, said cutting means adapted to engage the threads of the externally threaded member;
   a retainer having a smooth inner surface portion thereof that is adapted to contact the tips of the threads of the externally threaded member to thereby function as a guide surface and having at least one locating surface on another portion thereof; and
   at least one locating surface associated with said collet adapted to abut said locating surface of said retainer to maintain said guide surface in a fixed, spaced relationship relative to said cutting means;
   whereby said collet is selectively positioned along an externally threaded element with said thread cutting means engaging the threads of the threaded member and said retainer is positioned with said respective locating surfaces on said collet and retainer abutting one another and said guide surface contacting the tips of the threads of the external member.

8. The tool claimed in claim 7, wherein said guide surface is maintained in said fixed, spaced relationship with said cutting means with said guide surface located on one side of said opening bore and said cutting means located on the opposite side therefrom.

9. The tool claimed in claim 7, wherein:
   said collet includes at least one pair of surfaces adapted to cooperate with a wrench to effect rotation of said collet relative to the threaded member.

10. The tool claimed in claim 7, wherein:
    said locating surface associated with said collet and said locating surface of said retainer are arcuate.

11. The tool claimed in claim 7, wherein:
    said collet has a socket formed therein, said socket adapted to receive said retainer therein with a surface portion of said socket defining said collet associated locating surface which is adapted to abut said retainer locating surface to maintain said guide surface in a fixed, space relationship with said cutting means.

12. The tool claimed in claim 11, wherein:
    said retainer has a semi-cylindrical shape and includes two locating flats adapted to cooperate with locating flats forming a part of said socket.

13. The tool claimed in claim 7, wherein:
    said collet has a guide channel formed therethrough, said channel adapted to receive said retainer therein with a surface portion of said channel defining said collet associated locating surface which is adapted to abut said retainer locating surface to maintain said cutting means in said fixed, spaced relationship with said guide surface.

14. The tool claimed in claim 13, wherein:
    said retainer includes a head portion and a body portion that extends axially from said head portion, said body portion adapted to be received in said guide channel.

15. The tool claimed in claim 14, wherein:
    said retainer body portion includes two diametric flats adapted to cooperate with diametric flats forming a part of said guide channel.

16. The tool claimed in claim 5 or claim 11, wherein said collet is formed as a unitary structure.

* * * * *

UNITED STATES PATENT AND TRADEMARK OFFICE
CERTIFICATE OF CORRECTION

PATENT NO. : 4,201,503
DATED : May 6, 1980
INVENTOR(S) : William G. Nannen

It is certified that error appears in the above—identified patent and that said Letters Patent is hereby corrected as shown below:

Column 6, line 38, "44" should read -- 46 --;

Column 6, line 45, "manner" should read -- member --.

Column 7, line 14, "amended" should read -- appended --;

Column 7, line 49, "said" should read -- side --;

Column 7, line 67, "include" should read -- includes --.

Column 8, line 29, "bore" should be deleted.

Signed and Sealed this

Fifth Day of August 1980

[SEAL]

Attest:

SIDNEY A. DIAMOND

Attesting Officer

Commissioner of Patents and Trademarks